(12) United States Patent
Ramachandran et al.

(10) Patent No.: US 11,134,256 B1
(45) Date of Patent: Sep. 28, 2021

(54) SYSTEMS AND METHODS FOR EFFICIENT PARALLELIZED VIDEO ENCODING

(71) Applicant: Xilinx, Inc., San Jose, CA (US)

(72) Inventors: Avinash Ramachandran, Santa Clara, CA (US); Pavel Novotny, Waterloo (CA)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 16/745,163

(22) Filed: Jan. 16, 2020

Related U.S. Application Data

(60) Provisional application No. 62/793,267, filed on Jan. 16, 2019.

(51) Int. Cl.
| | |
|---|---|
| *H04N 7/12* | (2006.01) |
| *H04N 19/436* | (2014.01) |
| *H04N 19/91* | (2014.01) |
| *H04N 19/176* | (2014.01) |
| *H04N 19/152* | (2014.01) |
| *H04N 19/115* | (2014.01) |
| *H04N 19/164* | (2014.01) |
| *H04N 19/127* | (2014.01) |

(52) U.S. Cl.
CPC ......... *H04N 19/436* (2014.11); *H04N 19/115* (2014.11); *H04N 19/127* (2014.11); *H04N 19/152* (2014.11); *H04N 19/164* (2014.11); *H04N 19/176* (2014.11); *H04N 19/91* (2014.11)

(58) Field of Classification Search
CPC ................................................ H04N 19/436
See application file for complete search history.

(56) References Cited

U.S. PATENT DOCUMENTS

2020/0288168 A1* 9/2020 Zhang .................. H04N 19/583

* cited by examiner

*Primary Examiner* — Y Lee
(74) *Attorney, Agent, or Firm* — Goodwin Procter LLP

(57) ABSTRACT

Methods and systems for parallelized encoding of video are disclosed. According to one embodiment, a video encoder comprises a plurality of encoding engines. Each encoding engine is configured to receive a respective designated region of a video frame and produce respective quantized coefficients, the respective region having one or more unencoded frame blocks. Each encoding engine has a local symcoder for performing entropy-based encoding of the respective quantized coefficients. The video encoder has a rate control module, in communication with each encoding engine, for receiving from the respective local symcoder of each encoding engine a respective region-level bit count. The video encoder has a central buffer, in communication with each encoding engine, for receiving from each encoding engine the respective quantized coefficients. The video encoder has a final symcoder, in communication with the central buffer and the rate control module, wherein the final symcoder performs further entropy-based encoding of the respective quantized coefficients received in the central buffer, and transmits to the rate control module a frame-level bit count.

16 Claims, 3 Drawing Sheets

SYSTEMS AND METHODS FOR EFFICIENT PARALLELIZED VIDEO ENCODING

CROSS-REFERENCE TO RELATED APPLICATIONS

This application claims priority to and benefit of U.S. Provisional Patent Application No. 62/793,267, entitled "MECHANISM FOR EFFICIENT PARALLEL BINARY ARITHMETIC CODING USING MULTIPLE INSTANCES OF BINARY CODERS," filed on Jan. 16, 2019, the entire contents of which are incorporated herein by reference.

FIELD

This disclosure generally relates to video encoding techniques and, in particular, to parallelized encoders.

BACKGROUND

Video compression generally involves transforming raw frames of video data into a bitstream that is typically orders of magnitude smaller in size than the original raw stream, measured in bits/bytes of data, while preserving an adequate representation of the original video. Such video compression is usually lossy, and is used ubiquitously both in the storage and transmission of video data.

Many modern video encoders begin by dividing each frame of raw data into a set of square processing elements or blocks, and then process these blocks in a raster-scan order. In a typical encoding pipeline for the block-based hybrid encoding model (employed in various video coding standards such as H. 264, H. 265, VP9, etc.) every frame in the video typically undergoes the following operations:

- Division of pixels of the frame into blocks;
- Prediction (intra-frame and/or inter-frame);
- Computation of residuals after prediction, and transformation thereof to the frequency domain;
- Quantization of the transformed residual values using a Quantization Parameter (QP); and
- Entropy Coding, e.g., using Context Adaptive Binary Arithmetic Coding (CABAC) or Context Adaptive Multi-symbol Arithmetic Coding (CASAC) which can adjust the context parameters used in the encoding based on the latest encoding status.

Such a pipeline is often implemented using a single hardware engine or a single thread of a software process. In the prediction step, the encoder makes a prediction about a part of a current block of the frame based on parts of the video that have previously been encoded, and that closely approximates the actual pixels in the current block. Then, a difference between the actual pixels of the current block and the prediction thereof is generated, and the difference (also called an error), is encoded to obtain a compressed bitstream.

The encoders employ spatial and/or temporal redundancy typically present in video data. In general, the video information does not tend to change rapidly from frame to frame, or from pixel to pixel within a frame. Therefore, it is usually possible to find a very good prediction for the current block based on parts of the video that have been processed previously. If the prediction is good, the difference between the actual and predicted blocks (i.e., the error) can be small and, as such, the error can be represented (encoded) using much less data (in terms of bits or bytes) than that needed for encoding the actual pixel values in a block, which allows for effective compression of the video data.

Two forms of prediction are used in HEVC, VP9, and other similar encoders. The first is called Inter Prediction, which involves looking for matching pixels in a previously encoded frame. The term Motion Vector describes the offset between a region to be encoded in a current frame and a corresponding region in a previously encoded frame. The second prediction method is called Intra Prediction, which involves looking for matching pixels by projecting the values of the neighboring pixels of a current block to derive the predicted pixel values for the current block.

SUMMARY

Methods and systems for parallelized encoding of video are disclosed. According to one embodiment, a video encoder comprises a plurality of encoding engines. Each encoding engine is configured to receive a respective designated region of a video frame and produce respective quantized coefficients, the respective region having one or more unencoded frame blocks. Each encoding engine has a local symcoder for performing entropy-based encoding of the respective quantized coefficients. The video encoder has a rate control module, in communication with each encoding engine, for receiving from the respective local symcoder of each encoding engine a respective region-level bit count. The video encoder has a central buffer, in communication with each encoding engine, for receiving from each encoding engine the respective quantized coefficients. The video encoder has a final symcoder, in communication with the central buffer and the rate control module, wherein the final symcoder performs further entropy-based encoding of the respective quantized coefficients received in the central buffer, and transmits to the rate control module a frame-level bit count.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The present embodiments will become more apparent in view of the attached drawings and accompanying detailed description. The embodiments depicted therein are provided by way of example, not by way of limitation, wherein like reference numerals/labels generally refer to the same or similar elements. In different drawings, the same or similar elements may be referenced using different reference numerals/labels, however. The drawings are not necessarily to scale, emphasis instead being placed upon illustrating aspects of the present embodiments. In the drawings.

Figure 1:
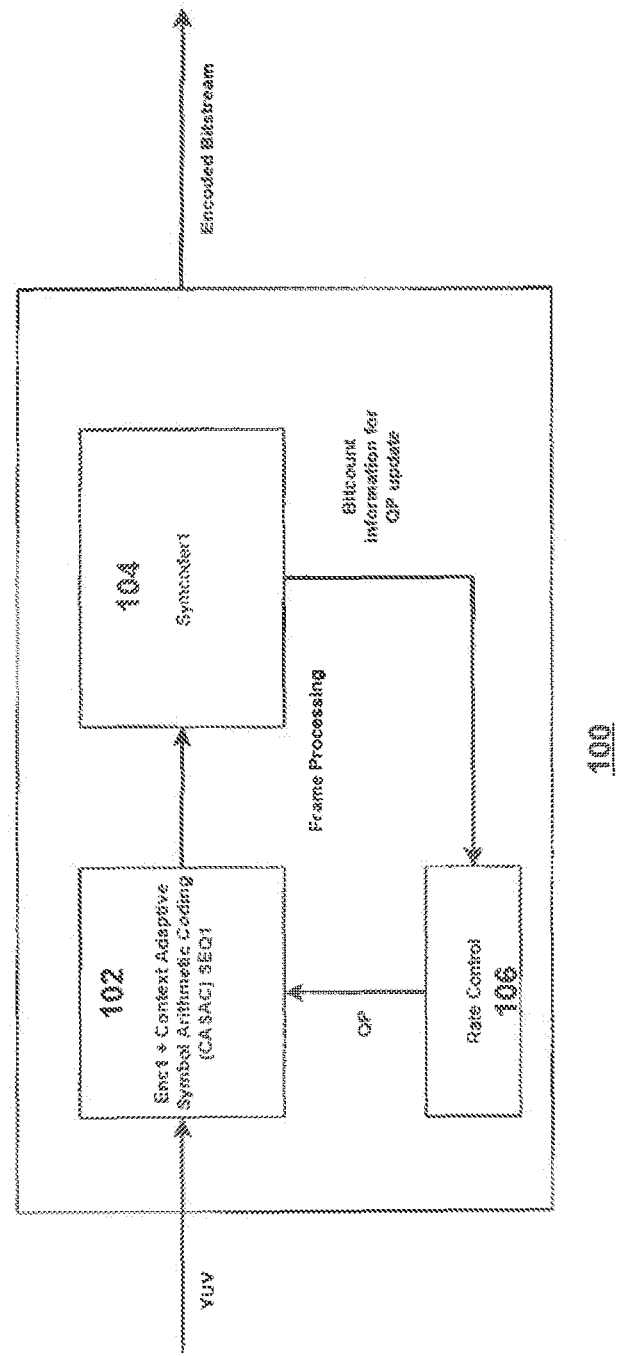
FIG. 1 schematically depicts a conventional video-frame encoding pipeline.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

The following disclosure provides different embodiments, or examples, for implementing different features of the subject matter. Specific examples of components and arrangements are described below to simplify the present disclosure. These are, of course, merely examples and are not intended to be limiting.

Methods and systems for parallelized encoding of video are disclosed. According to one embodiment, a video encoder comprises a plurality of encoding engines. Each encoding engine is configured to receive a respective designated region of a video frame and produce respective quantized coefficients, the respective region having one or more unencoded frame blocks. Each encoding engine has a local symcoder for performing entropy-based encoding of the respective quantized coefficients. The video encoder has a rate control module, in communication with each encoding engine, for receiving from the respective local symcoder of each encoding engine a respective region-level bit count. The video encoder has a central buffer, in communication with each encoding engine, for receiving from each encoding engine the respective quantized coefficients. The video encoder has a final symcoder, in communication with the central buffer and the rate control module, wherein the final symcoder performs further entropy-based encoding of the respective quantized coefficients received in the central buffer, and transmits to the rate control module a frame-level bit count.

FIG. 1 schematically depicts the conventional encoding pipeline described above, where the pipeline 100 receives raw video data (e.g., in the YUV or RGB format) at block 102, which performs the prediction, computation of residuals and transformation, and quantization operations. The final entropy encoding using Context Adaptive Binary or M-ary Arithmetic Coding process includes two phases or steps as follows:

Binarization and Context Modeling (CASAC SEQ): If binarization is present (in standards like H. 264, H.265, VP9), this step binarizes all non-binary symbols first. It then also provides a context model for every binary value (generally referred to as a "bin") in the binarized symbols. If binarization is not present (e.g. in AV1), the context model is provided for every symbol value in the symbol set. The context model is a probability model using which the symbol can be encoded. In the pipeline 100, this step is performed at module 102.

Arithmetic Encoding (Symcoder): This is an entropy coding step that uses the probabilities (contexts) provided by the earlier step and performs arithmetic encoding to output encoded bits for every symbol. In the pipeline 100, this step is performed at module 104.

According to one embodiment, a bincoder encodes binary symbols (e.g., bins); whereas a symcoder may encode both binary and non-binary symbols (e.g., m-symbol entropy coding). For a symcoder, the context (probabilities) are provided per symbol and not limited to binarized symbols. Providing context per symbol allows for a more compact representation of the context.

Upon successful completion of binary encoding, the number of bits resulting from the encoding is provided to the bit rate control module 106 so that a bit rate control module can use this information to allocate bits to various subsequent frames and also to tune the number of bits allocated to the subsequent blocks of pixels (or blocks) within the frame. This can be done by adjusting the Quantization Parameter (QP) used in module 102. The feedback loop thus created in the pipeline 100 is generally important for effective encoding of video data. In particular, the rate control module 106 must obtain information about the encoded bits in a timely manner so as to determine accurately the future bit allocation to ensure the best or desired compression performance. Moreover, in some video encoding schemes and standards, the probability information (context) used in module 102 is also updated at the end of completion of encoding of a frame using the information about the encoding. The updated context is then used for encoding subsequent frames.

In the pipeline 100 (FIG. 1), the step of arithmetic encoding performed at module 104 tends to be the bottleneck because arithmetic encoding of the entire frame cannot be completed until all blocks in the frame are encoded. Moreover, arithmetic encoding can only operate sequentially on the various blocks of the frame. Specifically, arithmetic encoding of a later block in the processing order cannot be performed until all earlier blocks in the processing order have been encoded. In other words, the symcoder of module 104 cannot be readily parallelized. Embodiments described herein feature a two-step implementation of the arithmetic coding operation, where the first step can be parallelized. Other preceding operations in the pipeline performed at the module 102 may also be parallelized, and a close approximation of the feedback encoding information needed by these operations can be provided from the parallelized first step of the arithmetic coding. The second step of arithmetic encoding may be completed asynchronously. As such, the operations in the entire encoding pipeline that uses embodiments of the two-step arithmetic coding in which the first step parallelized can be performed faster than in the conventional pipeline. The present system uses temporal and/or spatial prediction encoding models.

For encoding high resolution video frames at fast rates, e.g. 3840 pixel×2160 pixel frames at 60 frames per second (fps), the single hardware engine/thread (also referred to as single engine) approach may be inadequate, especially in software and FPGA implementations. Tile-based operation is usually provided in many video coding standards, and encoders using tiling can be implemented using a multi-hardware engine/multi-threaded system (also referred to as a multi-engine system) because every tile is self-contained and can be processed independently using a single engine. Thus, different engines can process different tiles simultaneously, and can thus speed up the overall encoding process. Tiling, however, generally imposes limitations on other coding steps such as prediction, and may also require an additional step of filtering across tile boundaries, which can result in loss in visual quality. Thus, a tile-based multi engine frame work, while improving processing performance, can result in undesirable compression efficiency loss and/or visual quality loss. As such, a multi-engine system that does not significantly degrade the visual quality and yet achieves the required processing performance is desired.

Many steps of the frame/pixel-block processing pipeline (described with reference to FIG. 1) can be parallelized, even without tiling. Without tiling, however, the arithmetic coding performed by the symcoder is a sequential process that operates on the blocks in succession, i.e., a later block in a sequence of blocks cannot be arithmetically encoded before all prior blocks in the sequence are encoded. As such, the conventional symcoder cannot be readily parallelized and, hence, blocks distributed to different engines cannot be arithmetically encoded in parallel using a conventional symcoder. The conventional encoding pipeline is therefore unsuitable for parallel processing.

One solution to overcome this limitation is to provide a framework having an independent symcoder where every step in the encoding pipeline except for the arithmetic coding is performed in parallel using multiple engines. The rate control process receives feedback from the symcoder on the number of bits encoded at the completion of encoding of a frame. The rate control process relies on this feedback to update its bit allocation scheme which in turn is used to control one or more parameters such as mode decision, i.e., choosing between inter and intra prediction, and QP for the next frame. A framework in which the symcoder works independently from the rest of the encoding pipeline can result in the rate control process not receiving bit consumption feedback in a timely manner which, in turn, may result in a loss of compression efficiency and/or visual quality.

To overcome these problems, embodiments of a multi-engine system described below can operate in parallel across all the stages of the encoding pipeline to achieve the required performance. Various embodiments of the multi-engine system can be implemented in hardware and/or as separate threads in software. According to various embodiments, a parallelized pipeline system employs several local binary arithmetic coding engines (local symcoders), and one final/global binary arithmetic coding engine (final/global symcoder) for the whole frame which produces the output bitstream for the frame. In this architecture, two core rate control mechanisms may be implemented to work together as follows:

1. Several local symcoder engines can provide immediate, low latency feedback about encoded initial bit counts for each block to the rate control module, which may then compute a near accurate bit estimate; and
2. The final/global symcoder can asynchronously provide a global bit count feedback at the end of every frame which may be used by the rate control module to adjust the initial bit count estimate.

Figure 2:
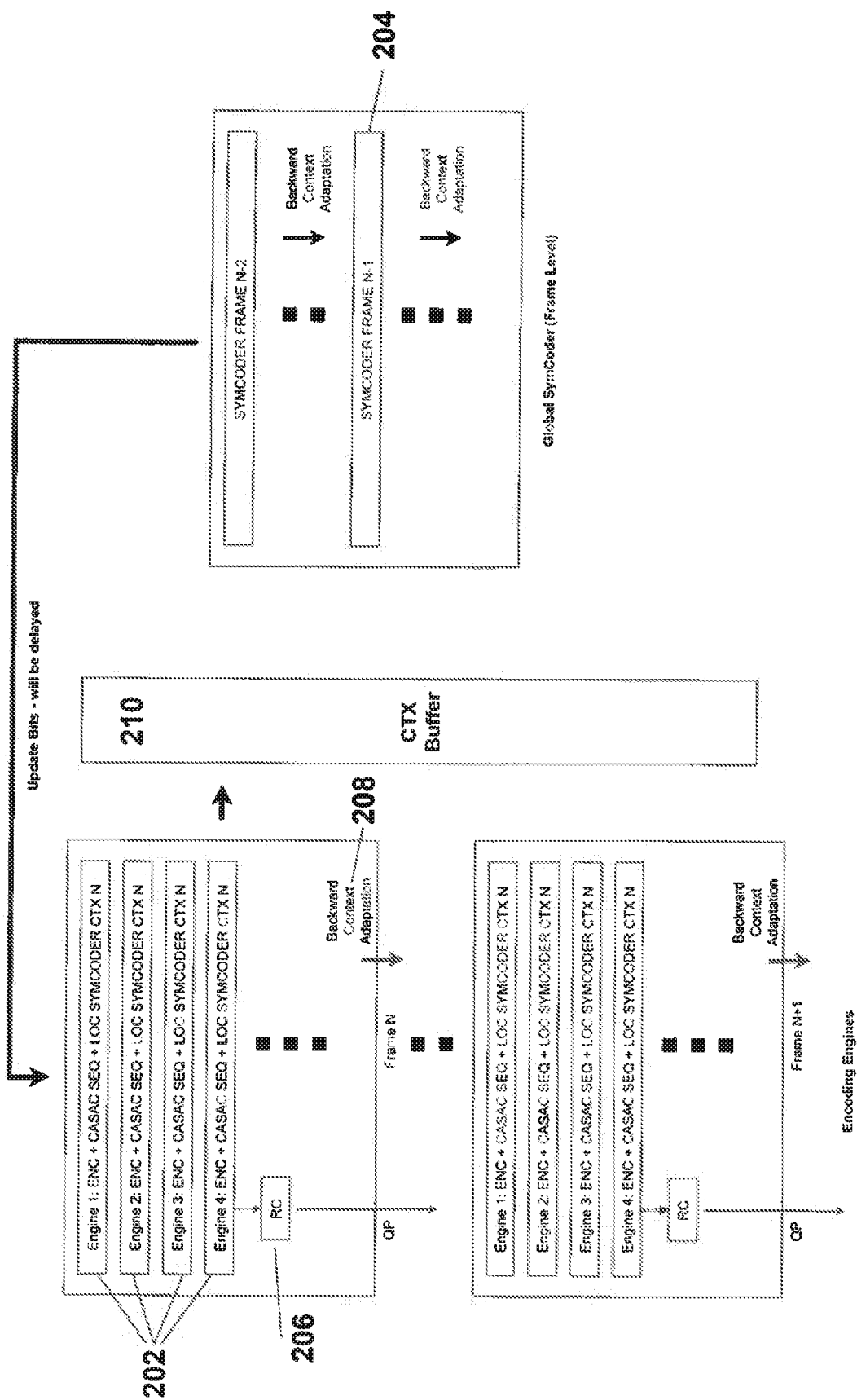
FIG. 2 schematically depicts a parallelized video-frame encoding system, according to one embodiment.

FIG. 2 schematically depicts a parallelized video-frame encoding system, according to one embodiment. With reference to FIG. 2, a frame level asynchronous, distributed symcoder system 200 employs multiple parallel encoding engines 202, according to one embodiment. In this embodiment, the distributed symcoder system 200 uses four engines (cores) 202 for encoding 3840×2160p frames at a rate of 60 fps. Systems having less than four or more than four (e.g., 6, 8, 12, 20, etc.) engines and systems for encoding frames of lower or higher resolutions, where the processing is performed at lower or higher speeds (e.g., 90 fps, 120 fps, etc.) are also contemplated. In the system 200, each engine 202 operates on one or more designated coding tree units (CTUs), also referred to as blocks (e.g., a block of 64×64 pixels per the H.265 standard). In some embodiments, each engine may processes one CTU at a time in raster scan order. This architecture can be extended for any number of engines (e.g., 2, 4, 12, 16, or more engines). The system 200 includes several local binary arithmetic coding engines (local symcoders) implemented via the engines 202, and one final binary arithmetic coding engine (final symcoder) 204 for the whole frame, where the final symcoder 204 eventually produces the output bitstream for the frame.

An entire video frame may be subdivided, either horizontally as CTU rows, or vertically as CTU columns, into non-overlapping regions, and each engine 202 is assigned one non-overlapping part of the frame, e.g., a particular non-overlapping region for processing thereof. The number of non-overlapping regions in a row or column of a frame is usually the same as the number of engines 202. As such, every engine may be assigned, in a row by row or column by column manner, to one particular non-overlapping region in the row or column of the frame. Each non-overlapping region includes at least one frame block (e.g., a CTU) and may include more than one blocks, in some embodiments.

At the start of encoding of every frame, each engine 202 is initialized to the frame level context. The engines then begin to encode their assigned regions in the frame in parallel. During the initialization, the probability tables for entropy coding of various symbols (also referred to as context) are assigned their respective default values as prescribed by the applicable encoding standard or scheme. Each engine 202 performs the prediction, computation of residuals and transformation, quantization, binarization, and context modeling/selection operations on the assigned block(s). In addition, each engine 202 performs local arithmetic coding operations on its assigned block(s). In some embodiments, the encoding engine only performs the arithmetic coding operations, and one or more other components, implemented in hardware and/or software, perform the prediction, computation of residuals and transformation, quantization, binarization, and/or context modeling/selection operations.

Each local symcoder (implemented as part of the corresponding engine 202) is a localized version of the symcoder that encodes only the blocks (e.g., CTUs) in the region assigned to the engine 202 implementing that local encoder. In particular, the local symcoder performs binary arithmetic encoding of all blocks within the local region (i.e., the non-overlapping region) assigned to the corresponding engine 202. The output of the local symcoder is an estimate of a part of the final symcoder output. Thus, the arithmetically coded values are close enough (e.g., within 10%, 5%, 2%, 1%, 0.1%, etc.) but not identical (though they can be, in some cases) to what would eventually get encoded in the final bitstream. This is because local arithmetic encoding only uses blocks in the engine-specific region.

Every engine 202 operates on its assigned region and the resulting approximate bit count for the frame, obtained by adding the respective bit counts provided by all the local symcoders implemented by the different engines 202, can be different from the final symcoder 204 output, which is provided by encoding all the blocks of the frame in sequence. This approximate bit count nevertheless provides a good estimate of the final bit count, and the approximate bit count can be used as an immediate (low latency) feedback to the rate control module 206. At the start of encoding of every frame, the local symcoders included in the engines 202 may be initialized to the respective CASAC context, which is provided from the respective local context updaters (also implemented in the respective engines 202) at the end of encoding of the previous frame. This is shown as the backward context adaptation 208 in FIG. 2.

Output of the local symcoder from each of the four encoding engines 202 is also fed to a global context (CTX Buffer 210) in a serial order (e.g., engine 1 followed by engine 2, etc.), for the entire frame. The CTX buffer 210 may be maintained in either local memory or DDR memory which is read accessible by the final symcoder 204. The final symcoder 204 operates in a serial fashion on the output of the CTX buffer 210. In particular, the final symcoder 204 uses the entries in the CTX buffer 210 to perform a serial encoding of the blocks in each frame. The respective outputs of the binarizers of each encoding engine 202 are entropy encoded, which is from the CTX buffer 210. The final symcoder 204 may run asynchronously with the encoding engines 202, where the encoding engines 202 may continue to process their assigned regions while the final symcoder 204 may operate at an independent pace. If needed, the final symcoder 204 may wait until the processing for the entire frame is completed by the local symcoders implemented by the engines 202. If the final symcoder 204 has to process a large number of bits and is slower than the encoding engines 202, the encoding engines 202 may continue to operate in parallel on subsequent frames without waiting for the final symcoder 204 to complete its processing of any prior frame(s). This provides much needed flexibility and can minimize the overall processing time.

Additionally, when it completes encoding a frame, the final symcoder 204 updates the rate control (RC) module 206 with the number of bits used for that frame. The rate control module 206 may receive this bit count asynchronously and may uses this updated bit count for bit allocation for subsequent blocks (e.g., CTUs) and/or frames. As one example, FIG. 2 shows that the final symcoder 204 sends the final bit count to the rate control module 206 after completing the encoding of frame N-2, when the encoding engines 202 are encoding frame N. The rate control module 206 may use this bit count to update is internal statistics and for bit allocation of the subsequent block(s) of the frame under processing (e.g., frame N) by the engines 202. Optionally, other processes implemented by the engines 202 may also use the updated bit count. Due to the asynchronous nature of the operation of the final symcoder 204 with respect to the rate control module 206, there can be a delay (albeit low) in providing a feedback of the final/global bit count for rate control. The rate control module 206 can tolerate such a delay, however, because it receives timely feedback from the local symcoders, and that feedback is a close approximation of the final bit count.

The rate control module 206 may also determine and assign quantization parameters for the respective blocks to be encoded by the engines 202, so that the required number of bits are allocated to such blocks, and the desired overall bit rate, video quality, and the required compression rate can be achieved and/or maintained.

In video pictures, neighboring blocks within the same picture can be highly correlated. Thus, the feedback on the bit count from one local symcoder can be highly correlated with the feedback from one or more other local symcoders that are processing different regions of the picture frame in parallel. In general, the bit rate feedback from all the local symcoders, which is immediate and provided with very low latency, can be useful in controlling the encoding process. The sum of the bit counts provided by the local symcoders can be used as a good approximation for the final bit count of the frame. This approximate bit count can be computed by the rate control module 206 with a high degree of accuracy during rate control analysis.

The embodiments described herein feature a parallelized architecture for a video encoder without using tiles or Wavefront Parallel Processing (WPP) which can have negative effects on the visual quality of the encoded video. In various embodiments, the final bin encoder 204 performs sequential arithmetic encoding of picture frame blocks encoded by the different processing engines 202. The outputs from the local symcoders of the different engines 202 are arranged in sequence, from engines 1 through 4 (engine M, in general), in the CTX buffer 210. These outputs are used by the final symcoder 204 to entropy encode the symbols for the whole frame in sequential order. It should be noted that the final symcoder 204 merely uses the CTX buffer 210 entries that are received from the local symcoders implemented by the engines 202, and performs arithmetic encoding completely independently of the local symcoders. Various embodiments feature local symcoders in different processing engines 202, which collectively encode all blocks in a frame and provide an approximate bit count as an immediate low latency feedback for rate control. The individual bit counts received from the individual engines 202 may be aggregated by the rate control module 206 to arrive at an approximate bit count for the frame. A final bit count for every frame is derived from the final entropy encoder/symcoder 204, which operates independently of the local symcoders and provides asynchronous bit rate feedback to the rate control module 206. Rate control according to various embodiments is thus a flexible mechanism that can extrapolate and use bit counts that are immediately available from local symcoders and can also integrate the final frame level bit count received asynchronously and when available from the final symcoder 204.

Figure 3:
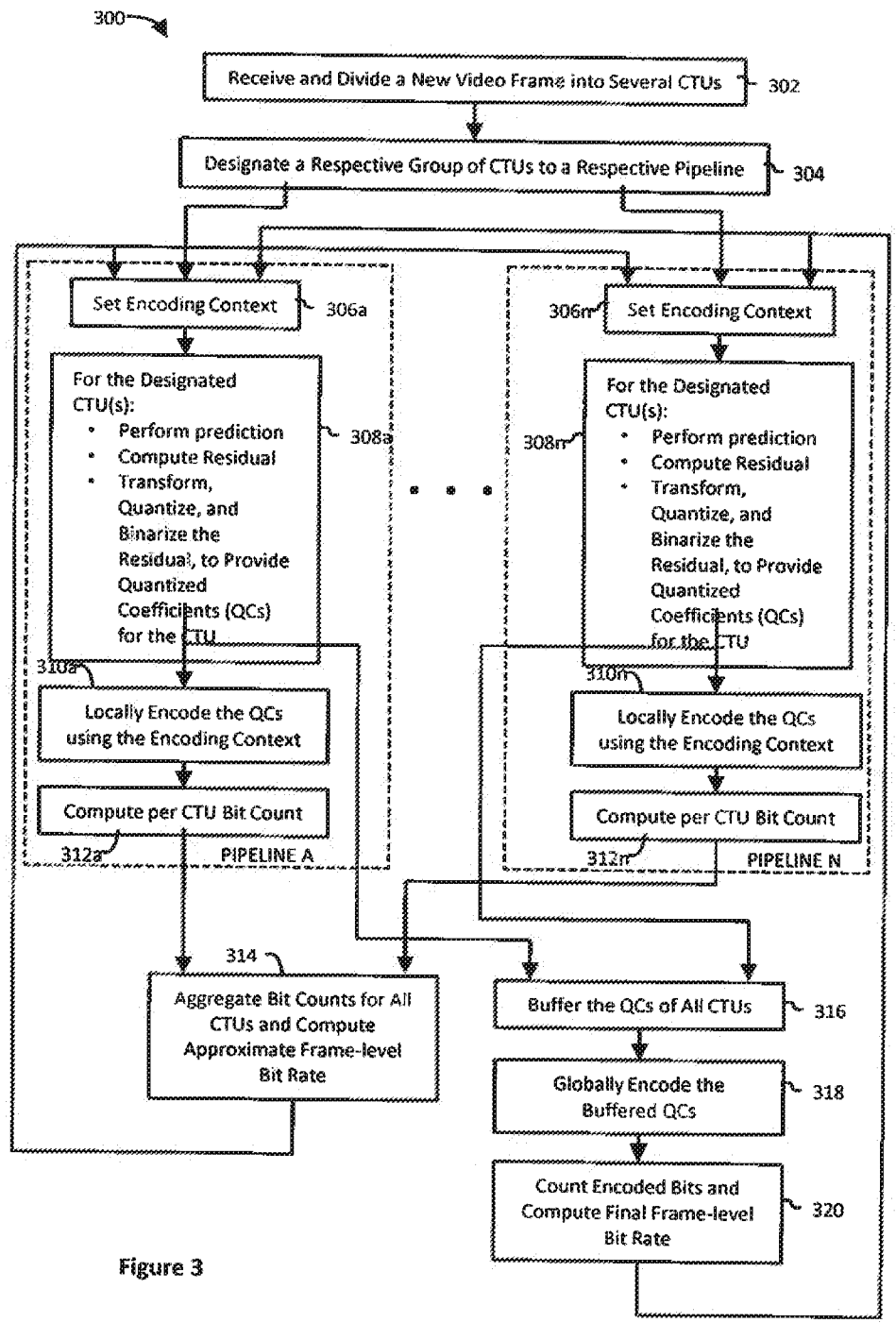
FIG. 3 is a flow chart of a parallelized encoding process, according to one embodiment.

FIG. 3 is a flow chart of a parallelized encoding process, according to one embodiment. With reference to FIG. 3, in the encoding process 300, a new unencoded video frame is received at step 302, and the frame is divided into groups of CTUs, where each CTU group corresponds to a region of the unencoded video frame. A CTU group may include one or more CTUs and, in step 304, each CTU group is designated to a respective pipeline that may be implemented by the encoding engines 202 (FIG. 2). The CTU(s) in different groups are processed in several different pipelines in parallel, as further described below.

Referring back to FIG. 3, in a first pipeline (PIPELINE A), a context (that may include probability tables for subsequent entropy coding) is set in step 306a. For processing of the CTU(s) of the very first frame, the context may be set or initialized to the default context for the selected encoding scheme or standard. For processing of the CTU(s) of a subsequent frame, the context may be set using the approximate or actual bit rates derived during the processing of the previous or earlier frame(s), as further described below. For the designated CTU(s), prediction, residual computation, transformation of the residual(s) to the frequency domain to obtain residual coefficients, quantization of the coefficients, and binarization of the quantized coefficients operations are performed in step 308a, to provide quantized coefficients (QCs) for the designated CTU(s).

In step 310a, the QCs are entropy encoded, e.g., arithmetically encoded, using the context set in step 306a. This encoding is referred to as local encoding because it is performed not for the entire frame but only for the designated CTU(s). Bit count for the designated CTU(s) is then computed from the encoded QCs, in step 312a. The steps 306a through 312a are repeated for each of the N pipelines, where N can be 2, 4, 8, 10, 16, etc. FIG. 3 shows steps 306n through 312n for PIPELINE N. The operations in two or more pipelines may be performed in parallel.

In step 314, the per CTU bit counts from all pipelines are aggregated to obtain an approximate frame-level bit count and an approximate frame-level bit rate. The approximate frame-level bit rate for the frame that was just processed is used in steps 306a through 306n to set the respective contexts (e.g., to select the probability tables for entropy coding in steps 310a through 310n, to select the respective quantization parameters used in steps 308a through 308n, etc.) for the processing of the next frame.

The QCs computed in each pipeline in steps 308a through 308n are stored in a buffer, in step 316. A final or global entropy encoder can access those QCs in the raster-scan order. The QCs stored in the buffer correspond to all of the CTUs of the frame being processed. In step 318, a final or global encoding of the QCs in the buffer is performed. Bits of the encoded QCs of the entire frame are counted in step 320, and the actual frame-level bit rate is then computed in step 320, as well. The operations 318, 320 may be executed asynchronously with the pipeline operations (i.e., the operations 306a-n through 312a-n). In other words, while the pipeline operations are performed with respect to a particular frame, the operations 318, 320 may be performed with respect to a different, earlier frame. Nevertheless, the actual frame-level bit rate computed in step 320 may be used in steps 306a through 306n to set the respective contexts for the processing of a new frame.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated.

What is claimed is:

1. A video encoder, comprising:
    a plurality of encoding engines, wherein each encoding engine is configured to receive a respective designated region of a video frame and produce respective quantized coefficients, the respective region having one or more unencoded frame blocks, and includes a local symcoder for performing, in parallel, entropy-based encoding of the respective quantized coefficients;
    a rate control module, in communication with each encoding engine, for receiving from the respective local symcoder of each encoding engine a respective region-level bit count;
    a central buffer, in communication with each encoding engine, for receiving from each encoding engine respective quantized coefficients; and
    a final symcoder, in communication with the central buffer and the rate control module, wherein the final symcoder performs entropy-based encoding of the respective quantized coefficients received in the central buffer, and transmits to the rate control module a frame-level bit count, wherein at least one encoding engine is configured to select a context model used by the corresponding local symcoder based on a region-level bit count generated by the corresponding local symcoder or the frame-level bit count.

2. The video encoder of claim 1, wherein the rate control module is configured to compute a rate for encoding an unencoded frame block based on one or more region-level bit counts received from the one or more local symcoders, or the frame-level bit count.

3. The video encoder of claim 1, wherein at least one of the encoding engines further comprises one or more of:
    a predictor for predicting pixel values of the one or more received unencoded frame blocks;
    a residual computation and transformation module for generating residuals for predicted pixel values of the one or more received unencoded frame blocks, and transforming the residuals; and
    a quantizer for quantizing the transformed residuals.

4. The video encoder of claim 3, wherein the rate control module is configured to compute a quantization parameter based on one or more region-level bit counts received from the one or more local symcoders, or the frame-level bit count.

5. The video encoder of claim 1, further comprising a frame divider configured to receive an unencoded video frame, divide the unencoded frame into a plurality of non-overlapping regions, each non-overlapping region comprising at least one frame block, and transmit at least one non-overlapping region to at least one encoding engine.

6. The video encoder of claim 5, wherein in each encoding engine the local symcoder is configured to encode at least 2040 blocks of size 64×64 pixels in one second, whereby the video encoder can encode 3840 pixel×2160 pixel frames at a rate of 60 frames per second (fps).

7. The video encoder of claim 1, wherein at least one encoding engine is one of an application specific integrated circuit (ASIC) or a field programmable gate array (FPGA).

8. The video encoder of claim 1, wherein at least one encoding engine has a processor in communication with memory, and having instructions in the memory that configure the processor as the local symcoder.

9. A method of encoding video frames, the method comprising:
    receiving by each of a plurality of encoding engines a respective designated region of a video frame, the respective region having one or more unencoded frame blocks;
    generating by each encoding engine respective quantized coefficients for the respective region of the video frame;
    performing by a respective local symcoder in each encoding engine, in parallel with other symcoders, entropy-based encoding of the respective quantized coefficients and providing a respective region-level bit count to a rate control module;
    determining by the rate control module, using the region-level bit counts received from the local symcoder of the plurality of encoding engines, an approximate frame-level bit count;
    receiving at a central buffer, from each encoding engine, respective quantized coefficients; and
    performing entropy encoding by a final symcoder of the respective quantized coefficients received in the central buffer, and transmitting to the rate control module a frame-level bit count, wherein at least one encoding engine selects a context model used by the corresponding local symcoder based on a region-level bit count generated by the corresponding local symcoder or the frame-level bit count.

10. The method of claim 9, wherein the rate control module computes a rate for encoding an unencoded frame block based on one or more region-level bit counts received from the one or more local symcoders, or the frame-level bit count.

11. The method of claim 9, further comprising performing by at least one of the encoding engines:
 prediction of pixel values of the one or more received unencoded frame blocks;
 computation of residuals for the predicted pixel values;
 transformation of the residuals to frequency domain; and
 quantization of the transformed residuals.

12. The method of claim 11, further comprising:
 computing by the rate control module a quantization parameter based on one or more region-level bit counts received from the one or more local symcoders, or the frame-level bit count.

13. The method of claim 9, further comprising:
 dividing, using a frame divider, the unencoded frame into a plurality of non-overlapping regions, each non-overlapping region comprising at least one frame block; and
 transmit at least one non-overlapping region to at least one encoding engine.

14. The method of claim 13, wherein in each encoding engine the local symcoder is configured to encode at least 2040 blocks of size 64×64 pixels in one second, whereby the video encoder can encode 3840 pixel×2160 pixel frames at a rate of 60 frames per second (fps).

15. The method of claim 9, wherein at least one encoding engine is one of an application specific integrated circuit (ASIC) or a field programmable gate array (FPGA).

16. The method of claim 9, wherein at least one encoding engine has a processor in communication with memory, and having instructions in the memory that configure the processor as the local symcoder.

* * * * *